United States Patent [19]

Hunter, Jr. et al.

[11] Patent Number: 5,011,802

[45] Date of Patent: Apr. 30, 1991

[54] COKING TAR IMPREGNATED REFRACTORY PRODUCTS

[75] Inventors: Orville Hunter, Jr., Columbia; James L. Hill; David E. Potts, both of Mexico, all of Mo.

[73] Assignee: A.P. Green Industries, Inc., Mexico, Mo.

[21] Appl. No.: 468,167

[22] Filed: Jan. 22, 1990

[51] Int. Cl.$^5$ .............................................. C04B 35/04
[52] U.S. Cl. ..................................... 501/100; 501/127
[58] Field of Search ................ 208/131; 501/100, 101, 501/99, 109

[56] References Cited

U.S. PATENT DOCUMENTS

| | | | |
|---|---|---|---|
| 2,952,605 | 9/1960 | De Varda | 501/101 |
| 3,079,266 | 2/1963 | Galy | 501/99 |
| 3,224,888 | 12/1965 | Metz | 501/101 |
| 3,265,513 | 8/1966 | Tidridge et al. | 501/101 |
| 3,436,237 | 4/1969 | Crookston et al. | 501/109 |
| 3,470,003 | 9/1969 | Waylett | 501/101 |
| 3,483,026 | 12/1969 | Weaver | 501/101 |
| 3,884,830 | 5/1975 | Grant | 502/429 |
| 4,229,221 | 10/1980 | Vemura et al. | 106/58 |
| 4,292,082 | 9/1981 | Danjyo et al. | 501/100 |
| 4,558,019 | 12/1985 | Kotliar et al. | 501/109 |
| 4,568,279 | 2/1986 | Logue et al. | 432/206 |
| 4,569,835 | 2/1986 | Di Cio et al. | 264/29.1 |
| 4,795,725 | 11/1989 | Addink et al. | 501/101 |

*Primary Examiner*—Anthony McFarlane
*Attorney, Agent, or Firm*—Senniger, Powers, Leavitt & Roedel

[57] ABSTRACT

A coking process in which tar impregnated refractory products are heated in a muffle within a furnace to a temperature sufficient to cause emission or release of the volatile constituents in the tars and pitches used for impregnation, whether by decomposition or distillation, for a time which is sufficient to remove substantially all of such constituents from the products, characterized by heating the refractory products in a muffle within the furnace while maintaining a positive pressure within the muffle during the emission of the volatile constituents, and thereafter cooling the refractories in a substantially nonoxidizing atmosphere. After the temperature of the refractory products is low enough to avoid any thermal shocking of the brick the brick are removed from the furnace and the muffle.

7 Claims, No Drawings

COKING TAR IMPREGNATED REFRACTORY PRODUCTS

This invention relates to an improved process for coking tar impregnated refractory products, such as brick.

BACKGROUND OF THE INVENTION

During the manufacture of some shaped refractory products, such as brick, it is customary to impregnate the fired product with petroleum pitch or tar or other resinous material in order to provide a refractory which, after tempering or coking, has a lower porosity than would otherwise be the case. The tar impregnation improves the resistance of the refractory to penetration by gases, liquids, and other materials which are likely to be encountered by the refractory under service conditions. In the case of refractories to be used in the basic metal industries, for example as furnace linings, the impregnated refractory is more non-wetting to liquid metals and slags.

Conventionally, tar impregnated products, hereinafter referred to for convenience as brick, have been shipped to the user after impregnation and installed to provide a brick-lined piece of equipment. Thereafter, as the equipment is placed into service, the brick are heated to operating temperature resulting in the emission of large quantities of volatile constituents of the pitch or tar used as the impregnant. Because of environmental concerns about these emissions (which are primarily aromatic hydrocarbons) users of the brick are desirous of obtaining impregnated brick from which substantially all of the volatiles have been removed. Such brick are referred to herein as coked brick.

As is known to those skilled in the art, refractory products are sometimes subjected to a tempering process and sometimes to a coking process. The fundamental difference between the two processes is that tempering process is conducted at about 400°-600° F. whereas the coking process is conducted at above 1000° F. As a result of these differences in temperature, tempering serves to remove some of the volatiles present in the impregnant. Coking, on the other hand, eliminates essentially all of the volatiles. Due to the higher temperatures employed in coking more sophisticated designs of the coking furnace are required in order to protect the ware being coked.

It may seem to be a relative easy task for the brick supplier to preheat or coke impregnated brick prior to shipment to customers in order to remove the volatiles. However, the solution to the problem is not that simple since the tar impregnation process is typically carried out on a large volume of tightly hacked brick. Thus a typical hack would occupy a space of the order of 27×35×50 inches and contain 450 equivalent standard brick.

In theory, removal of volatiles from the brick could be accomplished by heating the hack in a furnace to a temperature sufficient to drive off the volatiles. Unfortunately, such a practice is unsatisfactory since the time required to heat the innermost brick in the hack to a temperature sufficient to cause essentially complete volatilization of the organic substances originating from decomposition and/or distillation of pitch fractions either as a gas or vapor would take so long that the non-volatile residue from the impregnant, which provides the desired properties of impregnated brick, would be completely burned away in the more exterior brick in the hack.

On the other hand, a hack of impregnated brick could be disassembled into individual brick or small groups of brick so as to minimize the time consumed in the volatilization process. That is also an undesirable solution since very significant handling costs would be incurred because the coked brick would have to be reassembled into large hacks for shipping purposes. A further alternative is to heat the hacks very slowly to the temperatures required for volatilization of the organics, hopefully avoiding burning the more exterior brick in the hack. But that approach, even if feasible, would add a very significant cost to the impregnated products.

The environmental problems due to the emission of volatile organics originating from pitches or tars is not a problem limited to the refractory industry. The problem has been addressed, for example, in the manufacture of carbon anodes intended to be used for the electrolytic reduction of aluminum. Thus in U.S. Pat. No. 4,569,835 to Di Cio et al, carbonaceous blocks are produced by pressure molding or extruding a carbon-carrying mixture, such as petroleum coke, anthracite, gas black, graphite and the like, with a binder material, such as tars and/or pitches. The blocks are then calcined in order to bake the blocks to achieve the desired mechanical and electrical properties. The calcining operation is conducted in a tunnel furnace, wherein the blocks are coated or covered on all sides with powdered carbon to protect them against oxidation and stored in muffles mounted on carriages which are pushed through the furnace in an oxidizing atmosphere in accordance with a preset thermal schedule. During heating, primarily in the temperature range of 200°-600° C., (about 400°-1100° F.) the blocks being calcined release volatile organics originating from the pitch or tar. Heating gradients on the order of 40°-45° C. per hour are used during this temperature range in order to avoid cracking the blocks. The blocks remain in the furnace for 160 hours and they ultimately reach temperatures of the order of 1000°-1200° C. (1800°-2200° F.).

The muffles used in the process disclosed by Di Cio et al are described as usually open at the top with the walls and the bottom made from a porous refractory material which is pervious to the volatiles from the binder. As a result, combustion of the volatiles takes place on the exterior of the muffle as well as on the surface of the free or open layer of protective or filler powder. Alternatively, a refractory material can be placed over the top of the muffle to maintain combustion of the carbonaceous powder at the lowest level.

To date however, the refractory industry has not developed a cost effective and environmentally acceptable process for the removal of volatile constituents contained in tar or pitch impregnated refractory products prior to the use of such products in refractory-lined equipment.

SUMMARY OF THE INVENTION

It is an object of this invention to provide a process which enables removal of essentially all of the volatile constituents contained in tar impregnated refractory products in a cost effective and environmentally acceptable manner, thereby overcoming the problems described above. A further object is to provide high quality coked tar impregnated refractory products.

These and other objects, as will become apparent from the following description, are achieved by a coking process according to the present invention in which tar impregnated refractory products are heated in a muffle within a furnace to a temperature sufficient to cause emission or release of the volatile constituents in the tars and pitches used for impregnation, whether by decomposition or distillation, for a time which is sufficient to remove substantially all of such constituents from the products, characterized by heating the refractory products in a muffle within the furnace while maintaining a positive pressure within the muffle during the emission of the volatile constituents, and thereafter cooling the refractories in a substantially nonoxidizing atmosphere. After the temperature of the refractory products is low enough to avoid any thermal shocking of the brick the brick are removed from the furnace and the muffle.

As is known to those skilled in the art a majority of the products which are tar impregnated are the alumina containing refractories but of course other refractory products, such as fireclay, are also impregnated for some applications. The most typical alumina-containing products which are tar impregnated are those having a 60% to 80% alumina content.

While reference is made herein to the use of a furnace in the claimed process, it is to be understood that such term is only for convenience and is not limiting of the invention. Thus any heated enclosure suitable for carrying out the process whether described as a furnace, kiln, oven or otherwise can be used. For purposes of the instant process a suitable muffle includes sides and a closed top and contains openings or vents, necessary to allow the volatiles to escape into the furnace where they are burned. An oxidizing atmosphere is preferably maintained within the furnace during the emission of the volatile materials so that the volatile constituents are burned and not discharged into the atmosphere. As a consequence, the volatile materials are immediately burned or otherwise consumed as they exit the muffle. While that is the preferred method of operating the process it will be recognized by those skilled in the art that, depending upon the equipment available, combustion of the volatiles can be accomplished by other means, such as by the addition of a combustion zone downstream of the furnace vent. By oxidizing atmosphere is meant that excess oxygen is present in the atmosphere inside the furnace. Maintenance of an oxidizing atmosphere within the furnace can be accomplished by means known to the art. For example, in a gas fired kiln, excess air can be supplied to the gas burners. It is preferred that the oxygen content within the furnace during the emission of volatile materials be maintained above about 10% by volume of the atmosphere within the furnace, preferably above about 13% to about 20%, in order to insure that complete combustion of the volatile materials occurs. Determination of the amount of oxygen present can be determined by means known to the art, such as through the use of a suction probe connected to a commercially available oxygen analyzer.

For purposes of the instant process a suitable muffle includes sides, a bottom, and a closed top and contains openings or vents which allow the volatiles to escape as they issue from the refractory products. The number of openings in the muffle, their location and their design can be readily determined by those skilled in the art. For example, a suitable muffle design is one having a combination of one or more openings in the upper portion of the muffle and a hinged flap covering the opening and affixed to the exterior of the muffle so as to open toward the interior of the furnace during emission of volatile constituents and to close or seal the opening after emission has ceased. The combined volume of the opening(s) in the muffle should be such that the flow of volatile material from the muffle into the furnace is impeded to the extent that the pressure within said muffle is slightly elevated (on the order of 1-5 psi), i.e., a positive pressure is maintained within the muffle, during the emission of the volatiles from the brick. One apparent benefit of this preferred design is that the increased pressure decreases the time required to complete the coking process.

Regardless of specific details the muffle is designed so as to maintain a positive pressure therein during the emission of volatiles and to substantially prevent entrance of oxygen-containing gas into the interior of the muffle after emission of volatile constituents has subsided, i.e. during cool down of the refractory. By employing a muffle so designed the coked brick are allowed to cool in a non-oxidizing atmosphere insuring that the residual non-volatile portion of the impregnant is not destroyed.

The temperatures used in the instant coking process and the time needed to complete the process will be governed by various factors such as the softening point of the tar or pitch impregnant, the amount of tar which has been impregnated into the brick, the porosity and shape of the brick and the arrangement and number of brick within the muffle. Generally, for the typical pitches used in tar impregnation processes, which have softening points in the range of 125° to 250° F., brick temperatures in the range of 1000°-1300° F. should be achieved to insure essentially complete removal of the volatile materials from the impregnant. Achievement of the desired temperature can be determined by the use of thermocouples inserted at various locations inside the hack or by other means known to the art. The time required to achieve that result can also be readily determined by means known to the art, for example, by observation of the cessation of fume emission from the refractory undergoing the coking process.

Furthermore, the muffle should be designed to provide a ratio of the volume of the muffle to the volume of the brick to be coked of about 2:1 to about 1.1:1. Keeping the volumes within that range has been found to facilitate the design of the opening(s) in the muffle, and especially insures that during cooling of the brick after coking a non-oxidizing atmosphere is maintained within the muffle. Preferably the ratio of volumes is about 1.8:1 or less, and more preferrably about 1.2:1 to about 1.1:1.

Further advantages and features of the invention will be more clearly understood from the the following description of specific embodiments.

DESCRIPTION OF THE PREFERRED EMBODIMENTS

A series of tests were conducted to determine the feasibility of the process and establish suitable operating parameters. Accordingly, employing a muffle box, constructed of ¼ inch thick steel, and a reheat furnace fitted with an observation port, ten tests were run on 6 to 10 tar impregnated high alumina content brick which are manufactured by A. P. Green Industries, Inc. and sold under the trademark Kruzite R TI (70% alumina). The brick were weighed prior to testing. The muffle was a five-sided box, 16×14×12 inches, initially containing four ¼ inch holes in each face. A 18×16×¼ inch steel plate was placed in the bottom of the furnace, the impregnated brick were placed on the plate and the muffle placed over the brick. The furnace and muffle box were both equiped with a thermocouple. Each test was modified based upon the results from the preceeding test. The results from these tests are summarized in Table I, below:

1442° F. in the following hour. By that time large quantities of black smoke were observed coming from the furnace stack and around the sand seal of the muffle. The fumes burned vigorously for approximately 5 hours after which the gas burners were shut off. In about seven hours, the center brick had cooled to 580° F.

Following complete cooling, the brick were un-

TABLE I

|  | Test Number | | | | | | | | | |
|---|---|---|---|---|---|---|---|---|---|---|
|  | 1 | 2 | 3 | 4 | 5 | 6 | 7 | 8 | 9 | 10 |
| Number of Brick | 6 | 6 | 6 | 6 | 6 | 6 | 8 | 6 | 6 | 10 |
| Muffle/Brick Volume Ratio | 2.0 | 2.0 | 2.0 | 2.0 | 2.0 | 2.0 | 1.8 | 1.8 | 1.8 | 1.1 |
| Spacing T = Tight O = Open | T | T | T | T | O | T | T | T | O | T |
| Hours to 1200° F. | 4 | 4 | 4 | 4 | 4 | 4 | 4 | 4 | 4 | 4 |
| Hours - 1200° Soak | 4¼ | 1 | 1 | 1 | 1 | 1 | 2 | 2 | 1 | 2¼ |
| Furnace Oxygen Content, % | N.D. | 13 | 14 | 19 | 19 | 19 | N.D. | 14 | N.D. | N.D. |
| No. of Open ¼" Holes | 20 | 20 | 8 | 0 | 0 | 0 | 0 | 0 | 0 | 0 |
| ¼" Hole With Flap | NO | NO | NO | YES | YES | YES | YES | YES | YES | YES |
| Seal | NONE | NONE | NONE | NONE | NONE | NONE | NONE | COKE | $Al_2O_3$ | $Al_2O_3$ |
| % Wt. Loss | 4.3 | 4.0 | 3.5 | 3.8 | 3.8 | 3.9 | 3.6 | 3.8 | 3.8 | 3.7 |
| Fumes Burned | NO | NO | SLG. | YES | YES | YES | YES | YES | YES | YES |
| Surface Oxidation | YES | YES | YES | NO | YES | YES | SLG. | NO | NO | NO |
| Crust on Brick | YES | YES | YES | NO | YES | YES | NO | NO | NO | NO |
| Additional Wt. Loss @ 1800° F., % | N.D. | N.D. | N.D. | N.D. | N.D. | N.D. | N.D. | 0.4 | 0.4 | 0.4 |

Based upon the results of the above described tests it was concluded that the claimed coking process was clearly a viable process.

Example 11

To illustrate the instant process on a commercial scale, a steel muffle box with a removable bottom tray was constructed which would accomodate a typical hack of brick. The bottom tray was placed in a suitable kiln and loaded with a hack of 456 equivalent of the brick used in tests 1-10. Two thermocouples were placed on the exterior brick and two were embedded in the center of the setting. The muffle box was then placed over the hack and a 6' high sand seal was filled with coke breeze. The space for the sand seal was formed by making the bottom tray slightly larger than the muffle and providing the tray with 6' high walls. The furnace was fired according to the schedule shown in Table II, below.

TABLE II

| Elapsed Time - Hours | Furnace Temp. °F. | Outside Brick Temp. °F. | Center Brick Temp. °F. | Furnace $O_2$ Content - % by vol. |
|---|---|---|---|---|
| 1 | 310 | 88 | 90 | 18 |
| 2 | 585 | 76 | 88 | 13 |
| 3 | 895 | 145 | 97 | 13 |
| 4 | 1050 | 188 | 100 | 9 |
| 5 | 1245 | 375 | 111 | 8 |
| 6 | 1260 | 435 | 120 | 8 |
| 7 | 1250 | 484 | 130 | 8 |
| 8 | 1240 | 570 | 165 | 8 |
| 9 | 1250 | 589 | 200 | 8 |
| 10 | 1300 | 748 | 695 | 0 |
| 11 | 1305 | 1338 | 1442 | 8 |
| 12 | 1225 | 1330 | 1280 | 11 |
| 13 | 1185 | 1265 | 1210 | 13 |
| 14 | 1185 | 1233 | 1185 | 13 |
| 15 | 1170 | 1252 | 1210 | 13 |
| 16 | 1230 | 1248 | 1205 | 13 |
| 23 | 338 | 650 | 580 | — |

As is evident from the above, it took approximately 5 hours for the kiln to reach 1245° F. At this time, the center brick were only 111° F. Four hours later, the center brick temperature had only increased to 200° F., but increased rapidly to 695° F. in the next hour and to loaded. The outer brick had a slight amount of powdery carbon coating. The interior brick all had a good appearance. The outer row of the bottom brick were stuck to the box; however, the interior brick of the bottom layer were not. All of the bottom layer had a fair amount of crust and gummy residue which had drained down from the upper brick. A false, perforated bottom would eliminate this problem.

Slices were cut from several of the brick and tested for any additional weight loss in a 1200° F. and 1800° F. standard coking test (ASTM C 831-88). The results from those tests, listed in Table III, showed less than 0.1% weight loss at 1200° F. and only 0.4% loss at 1800° F. on the samples, indicating that very little additional fumes, if any, would be emitted in service.

TABLE III

| | COKING LOSS | |
|---|---|---|
| | % Weight Loss @ | |
| Brick Location | 1200° F. | 1800° F. |
| Bottom | +0.1 | 0.39 |
| Outside | +0.1 | 0.37 |
| Outside | 0.05 | 0.39 |
| Outside | +0.06 | 0.29 |
| Outside | 0.18 | 0.37 |
| Center | 0.35 | 0.40 |
| Center | 0.09 | 0.50 |
| Center | 0.08 | 0.46 |

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. In a process for coking tar impregnated refractory products wherein said products are heated in a furnace to a temperature sufficient to cause emission of volatile constituents from the tar and for a time sufficient to remove substantially all of the volatile constituents from the products, the improvement comprising, heating the refractory products in a muffle within the furnace while maintaining a positive pressure within the muffle during emission of the volatile constituents, and thereafter cooling the refractory products in a substantially non-oxidizing atmosphere.

2. A process of claim 1 wherein the ratio of the volume of said muffle to the volume of said products is of the order of about 2:1 to about 1.1:1.

3. A process of claim 2 wherein the ratio of the volume of said muffle to the volume of said products is of the order of about 1.8:1 to about 1.1:1.

4. A process of claim 3 wherein the ratio of the volume of said muffle to the volume of said products is of the order of about 1.2:1 to about 1.1:1.

5. A process of claim 4 wherein the refractory products have an alumina content of 60% to 80%.

6. A process of claim 5 wherein the refractory product is brick.

7. A process of any one of claims 1-6 wherein an oxidizing atmosphere is maintained within said furnace during the emission of the volatile constituents from the tar.

* * * * *